May 3, 1955  E. F. KURTZ  2,707,763
POLYPHASE ENERGY TRANSLATING MOTORS AND DEVICES
AND PROTECTIVE CIRCUITS THEREFOR
Filed Dec. 20, 1950  4 Sheets-Sheet 3
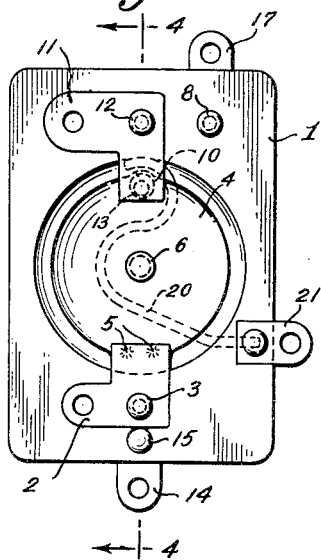
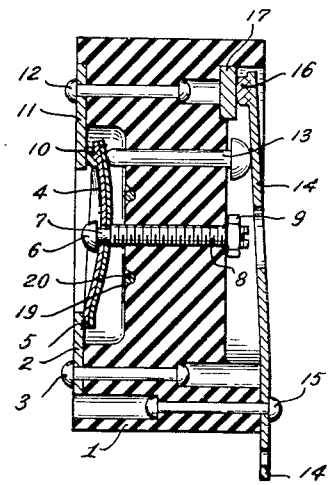
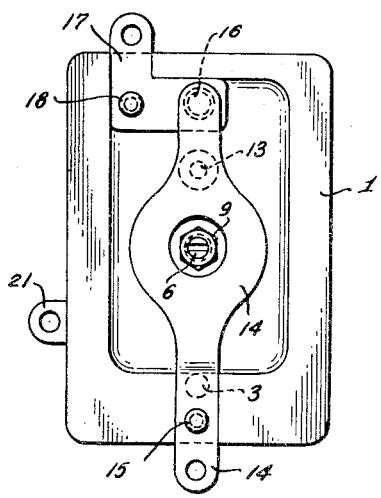
Inventor,
Edward F. Kurtz,
by Townsend M Gunn.
Atty.

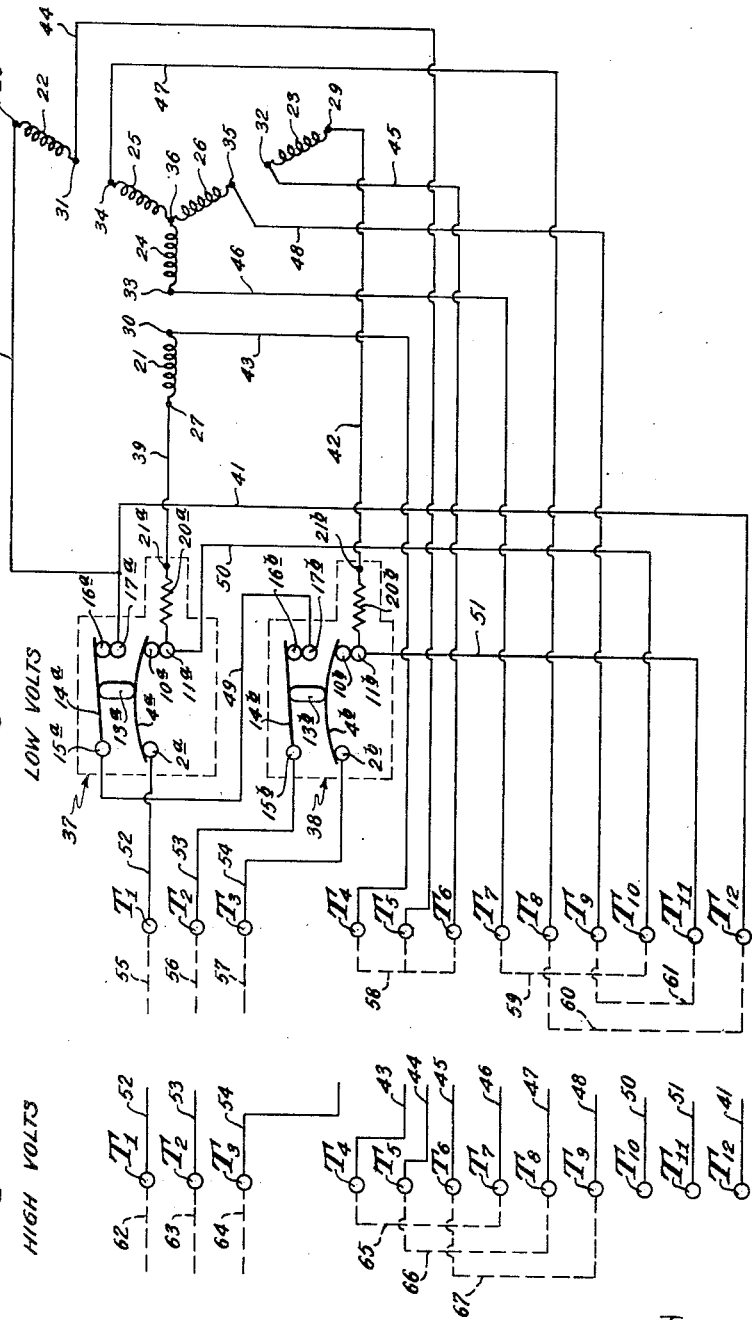

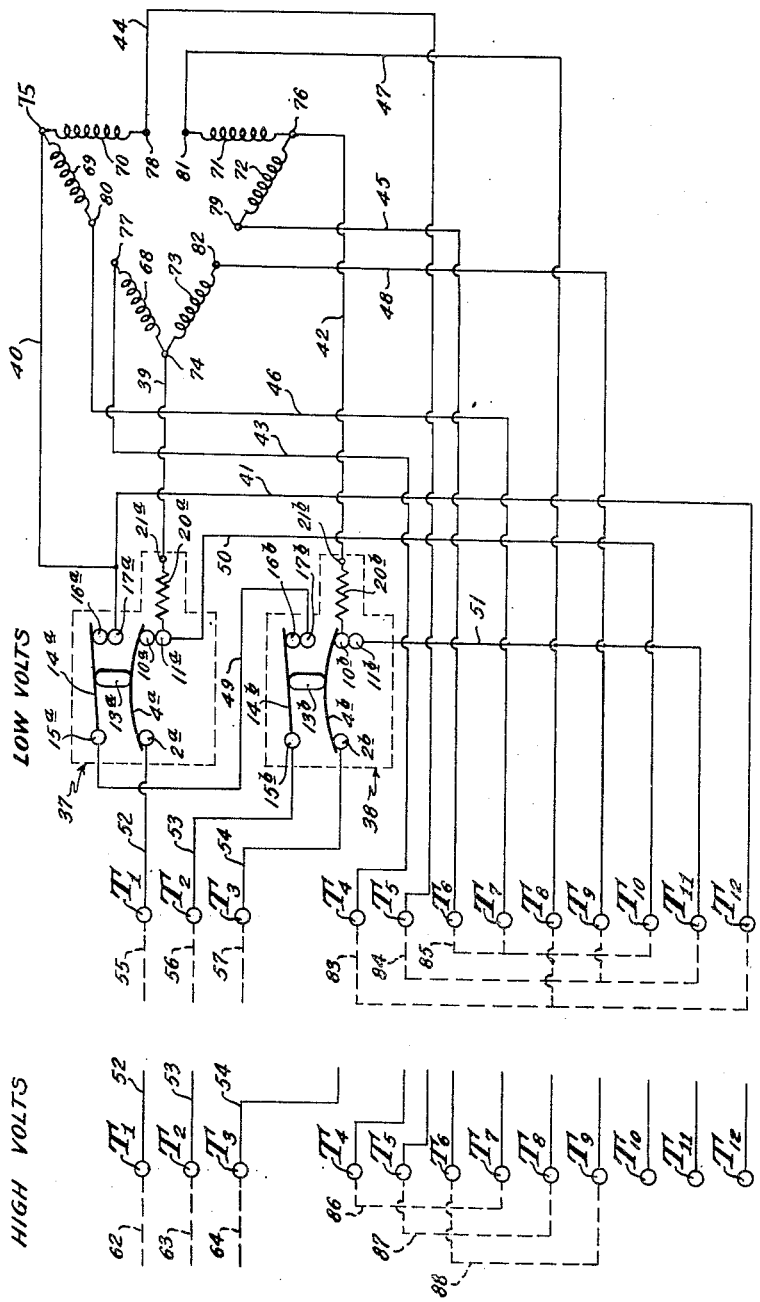

May 3, 1955

E. F. KURTZ 2,707,763

POLYPHASE ENERGY TRANSLATING MOTORS AND DEVICES
AND PROTECTIVE CIRCUITS THEREFOR

Filed Dec. 20, 1950

Inventor,
Edward F. Kurtz.

United States Patent Office 2,707,763
Patented May 3, 1955

2,707,763

POLYPHASE ENERGY TRANSLATING MOTORS AND DEVICES AND PROTECTIVE CIRCUITS THEREFOR

Edward F. Kurtz, Attleboro, Mass., assignor to Metals & Controls Corporation, Attleboro, Mass., a corporation of Massachusetts Application December 20, 1950, Serial No. 201,791

20 Claims. (Cl. 318—225)

This invention relates to electrical overload protective circuits for polyphase energy-translating devices and to devices incorporating such circuits; in particular the invention concerns itself with electrical polyphase motors of the kind which are adapted to operate at more than one voltage.

One of the objects of the invention is the provision of protective circuits of the class described which use as sensing elements thermally responsive switches which are electrically interconnected but mechanically independent; the provision of circuits of the class described in which the said thermally responsive switches and the connections thereto are so arranged that proper protective functioning of the switches is obtained for any of the voltages for which the energy-translating device is designed to operate; the provision of a polyvoltage polyphase energy-translating device having terminals or a terminal board (to which exterior connections are to be made) and interior operating windings with overload protective means incorporated electrically between said terminals or terminal board and said windings in such manner that simple exterior connections may be made to said terminals or terminal board to adapt the device for operation at any of its rated voltages with proper overload protection; the provision of a polyvoltage, polyphase energy-translating device of the last described type in which the protective means are plural means so arranged that the functioning of any one of them stops the flow of current through all of the windings of the polyphase device independently of the functioning of others of the protective means and regardless of the operating voltage that has been applied to the device; the provision of a dual voltage motor having protective means applied thereto in such internal electrical and thermal relation to the windings of the motor that regardless of which of the two voltages is applied to the motor to actuate it, the motor is properly protected without having to change the protective means; and the provision of circuits and devices of the classes above described which are relatively simple and which employ simple and economical protective means.

Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention:

Fig. 1 is a diagram of a circuit of the present invention shown applied to a polyphase energy-translating device having Y-connected windings, and with certain exterior connections for low voltage operation being indicated thereon;

Fig. 1a is a diagram of certain exterior connections for high voltage operation, to be used in place of the external connections of Fig. 1;

Fig. 2 is a diagram of a circuit of the present invention shown applied to a polyphase energy-translating device having delta-connected windings, and with exterior connections for low voltage operation being indicated thereon;

Fig. 2a is a diagram of certain exterior connections for high voltage operation, to be used in place of the external connections of Fig. 2;

Fig. 3 is a top plan view of a thermally responsive protective switch usable in the present invention;

Fig. 4 is a cross section taken substantially along line 6—6 of Fig. 3;

Fig. 5 is a bottom plan view of the switch of Fig. 3;

Fig. 6 is an alternative diagram of a circuit of the present invention, and with interior connections for low voltage operation being represented thereon; and Fig. 6a is a diagram of certain exterior connections for high voltage operation, to be used in place of external connections of Fig. 6.

Similar reference characters indicate corresponding parts throughout the several views of the drawings.

For the sake of simplicity herein, the invention is described as it applied to a motor, but the invention can be applied similarly and equally well to other forms of energy-translating devices.

There is a wide use of thermal-overload protectors in conjunction with electrical motors, where the protectors control the motor directly (without intervening relays or contactors) and are of such nature that they can be mounted directly in the motor by the motor manufacturer. In this way, the overload protection switches can be arranged to have the proper characteristics for the particular motor; and because the protector is responsive both to the actual temperature of the motor and to its current, more accurate protective results can be obtained. However, one of the problems of this art has been the protection of polyphase motors in a simple and efficient manner where the motor is of the kind that can be connected to be operated at more than one voltage, a so-called dual voltage motor being an example of this type.

United States Patent No. 2,312,915 (Reissue Patent No. 22,973) shows the use on single-voltage polyphase motors of two protectors each comprising a single-throw double-pole switch, a thermally responsive element adapted to operate both poles of the switch, and a heater in series with the switch and thermally adjacent to said element. However, said patent does not solve the above stated problem of protection for polyphase motors which are adapted for operation on more than one voltage.

In addition, it is the desire of motor manufacturers to sell a multi-voltage motor having overload protection incorporated therein in such a manner that the customer can make external connections to a terminal board on the motor, or to leads for that purpose brought out from the motor, to connect the motor to one or the other of its rated voltages, without having to change the protective device for proper operation under the selected voltage conditions. It is desirable to have the protector so connected internally of the motor, and so designed, that the user of the motor need do no more than make a few simple external connections and yet have a protected motor.

It is the general purpose of this invention to provide a circuit or circuits for accomplishing these objectives, and to provide such a motor incorporating such circuits.

In the present invention, two like thermal switches are used, each of which has a single-throw, double-pole switch actuated by a single thermal element, and the two switches are electrically connected in a circuit that accomplishes the above objects.

While it is not a part of the present invention, the construction of a switch which will satisfactorily accomplish the proper circuit operations, according to the invention, will first be described.

Referring to Figures 3, 4 and 5, numeral 1 indicates a base of electrical insulating material, upon which are mounted the various elements of the switch. A supporting plate 2 made of brass or steel or other electrical-conducting material is held on the base 1 by means of a rivet 3 passing therethrough. Suitably attached to supporting plate 2 at one end thereof by welding, riveting or any other suitable fastening, is a thermostatic disc 4 such as described and claimed in J. A. Spencer Patent 1,448,240, dated March 13, 1923. Disc 4 is shown electrically spot-welded to the supporting plate 2 by means of a tab 5 formed on the disc as an integral part thereof. A supporting and adjusting screw 6 is fastened to the center of the disc in a rotatable manner by means of proper shoulders and abutments as indicated at numeral 7, and, by engagement with a threaded hole 8 in the base 1, is used to adjust the operating temperatures of the element 4. A lock nut 9 is used to hold screw 6 from turning after the adjustments are made. Welded or otherwise suitably fastened to the diametrically opposite point on the disc from the tab 5 is a contact button 10. Button 10 makes good electrical connection with the disc 4. Co-operating with the button 10 is a contact plate 11 which is held firmly on the base 1 by means of a rivet 12.

Extending through base 1 in a slidable manner in a hole therethrough is a push rod 13 which is actuated by the motion of the thermal element 4, and which is made of an electrical insulating material such as "Bakelite." Push rod 13 in turn moves a switch arm 14 on the other side of the base. Switch arm 14 is made of spring steel or brass, or any other suitable electrical conducting material having the necessary resilient character. Switch arm 14 is mounted firmly at one end on the base by means of a rivet 15 passing therethrough. Fastened on the opposite or movable end of the switch arm 14 by welding or riveting so as to be in electrical connection therewith is an electrical contact button 16. Cooperating with movable contact button 16 is stationary contact plate 17 which is held securely to the base 1 by means of a rivet 18. Spring arm 14 is tensioned slightly to hold contacts 16 and 17 normally engaged. In a recess 19 provided in the base 1 is mounted a heater wire 20 adapted to heat the thermal element 4. One end of heater wire 20 is connected to contact plate 11 and the other end to a terminal plate 21. The purpose of the heater 20 is to offset the lag in temperature between the winding of the motor and the thermal element 4 when the winding temperature rises rapidly from excessive current as when the motor is stalled or very heavily overloaded.

Other details of the construction of the switch need not be recited herein. The operation of the switch is as follows:

If the disc 4 is heated either by increase in ambient temperature, or by the passage of electrical current through it and the electrical heater 20, or by a combination of these means, to a temperature sufficient to actuate it, it will snap its movable end and contact 10 to the right from the Fig. 4 position, for reasons indicated in the above-mentioned Spencer Patent 1,448,240. In doing so, the disc 4 breaks the electrical connection between movable contact 10 and stationary contact 11. At the same time, it also pushes to the right the insulating push rod 13, which in turn pushes the switch member 14 to the right, thus breaking the electrical connection between movable contact 16 and stationary contact 17. Thus, it is seen that the single thermally actuated element 4 actuates what is in effect a single-throw, double-pole switch.

Any other switch of suitable nature may be used in the circuits of the present invention.

Referring now to Fig. 1, there is shown schematically a circuit embodying the present invention in a polyphase motor. The drawing has been made schematic for clarity, and the motor frame and other mechanical parts have been omitted for the same reason. Indicated by numerals 21, 22, 23, 24, 25 and 26 are the windings of a dual-voltage polyphase motor, the windings being connectible in series or parallel to adapt the motor for operation on the desired voltage. The windings are each provided with end terminals indicated by numerals 27, 28, 29, 30, 31, 32, 33, 34 and 35. As drawn, the three remaining and unnumbered end terminals are connected to neutral point 36.

Indicated generally by numerals 37 and 38 are two of the above described protective switches. Again, these are indicated schematically for purposes of clarity, and are mounted either on the motor frame or directly on or in the motor windings, the mounting being such that each of the protective switches 37 and 38 is subjected to the heat of the windings.

Indicated by numerals T1, T2, T3, T4, T5, T6, T7, T8, T9, T10, T11, and T12 are the terminals of the motor to which predetermined internal connections are made by the motor manufacturer, and to which the user of the motor will connect voltage supply leads and will make certain other external connections to adapt the motor for operation on the applied voltage. The said terminals T1, T2, etc. may be either terminals mounted, for example, on a terminal board mounted on the motor, or may be the ends of leads brought out of the motor for the user to connect to as described below.

Internal connections are made as follows: Winding terminal 27 is connected by wire 39 to terminal plate 21a; winding terminal 28 is connected by wire 40 to contact plate 17a; contact plate 17a is connected by wire 41 to terminal T12; winding terminal 29 is connected by wire 42 to terminal plate 21b; winding terminal 30 is connected by wire 43 to terminal T4; winding terminal 31 is connected by wire 44 to terminal T5; winding terminal 32 connects by wire 45 to terminal T6; winding terminal 33 connects by wire 46 to terminal T7; winding terminal 34 connects by wire 47 to terminal T8; winding terminal 35 connects by wire 48 to terminal T9; switch arm 14a is connected by plate 15a and wire 49 to contact plate 17b; contact 11a connects by wire 50 to terminal T10; contact 11b connects by wire 51 to terminal T11; plate 2a connects by wire 52 to terminal T1; switch arm 14b is connected by plate 15b and wire 53 to terminal T2; and plate 2b connects by wire 54 to terminal T3.

As explained above, if the motor or other device is provided with a terminal board, then the above connections are made to the proper terminal (T1, T2, . . . etc.) on the board. If the motor is not provided with a terminal board, then the ends of the respective wires would be brought out of the motor for connection thereto by the user of the motor.

With the internal connections made as outlined above, the motor is adapted to be exteriorly connected for low or high voltage in the manner now to be described.

Referring to Fig. 1 for low voltage connections, the dotted lines to the T-series of terminals (T1, T2, . . . etc.) indicate how the exterior connections are to be made by the motor user. Low voltage polyphase power lines 55, 56 and 57 are to be connected to terminals T1, T2 and T3, respectively. Terminals T4, T5 and T6 are to be connected together by wire 58. Terminals T7 and T10 are to be connected together by wire 59. Terminals T8 and T12 are to be connected together by wire 60. Terminals T9 and T11 are to be connected together by wire 61.

With these external connections made, power is delivered to the motor windings in the following ways: From power line 55 through wire 52, thermostatic disc 4a, heater 20a, and wire 39 to winding terminal 27. Also from power line 55 through wire 52, thermostatic disc 4a, wire 50, external wire 59 and wire 46 to winding terminal 33. From power line 56 through wire 53, switch arm 14b, wire 49, switch arm 14a, and wire 40 to winding terminal 28. Also from power line 56 through wire 53, switch arm 14b, wire 49, switch arm 14a, wire 41, external wire 60, and wire 47 to winding terminal 34. From power line 57 through wire 54, thermostatic disc 4b, heater 20b, and wire 42 to winding 29. Also from power line 57 through wire 54, thermostatic disc 4b, wire 51, external wire 61, and wire 48 to winding terminal 35. Winding terminals 30, 31 and 32 are electrically interconnected by wires 43, 44, 45, and external wire 58.

With these connections, it will be noted that the proper motor windings are parallel connected for operation on low voltage. It will also be noted that heater 20a is connected in a circuit across the voltage applied by wires 55 and 56 in a circuit including the series connected heater 20a, winding 21 and winding 22. Correspondingly, heater 20b is connected in a circuit across the voltage applied by wires 56 and 57 in a circuit including the series connected heater 20b, winding 23, and winding 22. Heaters 20a and 20b are also connected in a circuit across the voltage applied by wires 55 and 57 in a circuit including the series connected heater 20a, winding 21, winding 23, and heater 20b.

The operation of the protective circuit is as follows:

If the protectors 37 and 38 are made to match the motor characteristics properly, and are properly mounted in or on the motor, the currents traversing the heaters and discs plus the temperature of the motor where the protectors are mounted will cause the discs to snap to their switch-open position when the maximum safe temperature for the motor windings is reached under operating conditions. It is not likely that the discs will function simultaneously, but either one on functioning will interrupt two of the three wires 52, 53 and 54 supplying power to the motor windings and thus the operation of either disc will cause deenergization of the motor. If both protectors should cut out, the motor will not be reenergized upon the closing of one protector but will be reenergized on the closing of the last protector to close. This protective functioning occurs, and reenergization occurs as described above, regardless of whether the protectors are made automatic in closing or are of the type which must be manually reclosed.

Turning now to Fig. 1a, there is shown schematically the external connections to be made in place of the external connections of Fig. 1 to adapt the motor of Fig. 1 for operation on high voltage. The internal connections to the terminal board remain the same as outlined above for low voltage operation, and thus one of the advantages of the invention is realized. The user of the motor does not have to tamper with the internal connections nor make any changes in the protectors already incorporated in the motor. These remain the same for both low and high voltage operation. All the user must do is change the external connections, as follows:

High voltage polyphase power lines 62, 63 and 64 are to be connected to terminals T1, T2 and T3, respectively. Terminals T4 and T7 are to be connected by wire 65. Terminals T5 and T8 are to be connected by wire 66. Terminals T6 and T9 are to be connected together by wire 67. Terminals T10, T11 and T12 are left not connected.

It will be noted that by connecting terminal T4 to terminal T7, winding terminals 30 and 33 are connected together electrically, thus putting windings 21 and 24 in series for high voltage operation. By connecting terminal T5 to terminal T8, windings 22 and 25 are similarly put in series for high voltage; and by connecting terminals T6 and T9, windings 23 and 26 are put in series. It is also to be noted that heater 20a is connected in a circuit across the voltage applied by wires 62 and 63 in a circuit including the series connected heater 20a, windings 21 and 24, and windings 22 and 25. Heater 20a is also connected in a circuit across the voltage applied by wires 62 and 64 in a circuit including the series connected heater 20a, windings 21 and 24, and windings 23 and 26. Similarly, heater 20b is connected in a circuit across the voltage applied by wires 63 and 64 in a circuit including the series connected heater 20b, windings 23 and 26, and windings 22 and 25. Heater 20b is also connected in a circuit across the voltage applied by wires 62 and 64 in a circuit including the series connected heater 20b, windings 23 and 26, and windings 21 and 24. Thus, as in the circuit of Fig 1, each heater is affected by the series current in two phases of the power supply.

With the external connections made as above described in this Fig. 1a circuit, power is delivered to the motor windings in the following ways: From power line 62 through wire 52, thermostatic disc 4a, heater 20a, and wire 39 to winding terminal 27. From power line 63 through wire 53, switch arm 14b, wire 49, switch arm 14a, and wire 40 to winding terminal 28. From power line 64 through wire 54, thermostatic disc 4b, heater 20b, and wire 42 to winding terminal 29.

The operation of the protective circuit is similar to that described for the Fig. 1 circuit. If either of protectors 37 and 38 functions, it will interrupt two of the three wires 52, 53 and 54 supplying power to the motor windings thus deenergizing the motor. So also, the motor will not be reenergized until the last of the protectors to close its circuit, does so either automatically if the protector is of the automatic resetting type, or is closed last manually if the protectors are of the manual reset type.

Turning now to Figs. 2 and 2a, there is shown a delta-connected polyphase motor with the internal circuit and protectors arranged so that with the external connections made as indicated, the motor is adapted, respectively, for low and high voltage operation. The windings of the motor are indicated by numerals 68, 69, 70, 71 72, and 73, and have winding terminals 74, 75, 76, 77, 78, 79, 80, 81, and 82 as indicated.

Internal connections are made as in Figs. 1 and 1a, with the following exceptions: Wire 39 connects to winding terminal 74, wire 40 connects to winding terminals 75, and wire 42 connects to winding terminal 76; wires 43 and 46 connect, respectively, to winding terminals 77 and 80; wires 44 and 47 connect, respectively, to winding terminals 78 and 81; and wires 45 and 48 connect, respectively, to winding terminals 79 and 82.

The external connections for the low voltage adaptation are as follows: Referring to Fig. 2, terminals T4, T8, and T12 are connected together by wire 83; terminals T5, T9, and T11 are connected by wire 84; and terminals T6, T7, and T10 are connected by wire 85. Low voltage power leads 55, 56 and 57 are connected, respectively, to terminals T1, T2, and T3.

With these external connections thus made, it will be observed that the windings of the motor are properly connected in parallel for operation on polyphase low voltage, as follows: Across the voltage applied by wires 55 and 56 are paralleled windings 68 and 69; across the voltage applied by wires 55 and 57 are paralleled windings 72 and 73; and across the voltage applied by wires 56 and 57 are paralleled windings 70 and 71. It is to be noted that heater 20a is influenced by the current in windings 68 and 73; and heater 20b is influenced by the current in windings 71 and 72. Thus each heater is influenced by the current in two of the motor windings.

The operation of the protective circuit is similar to that described above for Figs. 1 and 1a, and need not be further detailed here.

Referring now to Fig. 2a, there is shown the motor of Fig. 2 connected for use on high voltage. The internal connections are the same as those of Fig. 2. The external connections differ from those of Fig. 2, and are as follows: High voltage polyphase leads 62, 63, and 64 are connected respectively to terminals T1, T2, and T3. Terminals T4 and T7 are connected together by wire 86; terminals T5 and T8 are connected together by wire 87;

and terminals T6 and T9 are connected together by wire 88. Terminals T10, T11 and T12 are left unconnected. With these external connections, it is seen that windings 68 and 69 are connected together in series across the voltage applied by wires 62 and 63; windings 70 and 71 are connected together in series across the voltage applied by wires 63 and 64; and windings 72 and 73 are connected together in series across the voltage applied by wires 62 and 64. It is to be observed that heater 20a is subject to the current in the combined windings 68 and 69, as well as windings 72 and 73. Similarly, heater 20b is subject to the current in the combined windings 70 and 71 as well as windings 72 and 73.

Again, the operation of the protective circuit is as described above for Figs. 1, 1a, and 2 and need not be further detailed here.

At this point, attention is directed to the above remarks concerning the current that traverses the heaters 20a and 20b in the four illustrative circuits. The current in heaters 20a and 20b in the case of the Y-connected motor is substantially the same regardless of the voltage to which the motor is connected. For example, considering Fig. 1, the circuit is in essence two sets of Y-connected windings connected in parallel across the polyphase voltage applied by wires 55, 56, and 57. One set of Y-connected windings comprises the windings 21, 22, and 23 having a common neutral point connected by wire 58. The other set comprises windings 24, 25 and 26, with the neutral point 36. Considering the first set, call the voltage across each of the windings 21, 22 and 23 to the neutral point, $E\phi$. Then the current in each winding is $E_\phi/Z$ when Z is the effective impedance of the winding. But heater 20a is directly in series with winding 21 and hence the current in this heater must also be $E_\phi/Z$. The current in heater 20b will likewise be $E_\phi/Z$. Turning now to Fig. 1a, let the applied voltage be, for example, twice the applied voltage of Fig. 1. The voltage to the neutral point in each phase will now be $2 E_\phi$. However, each leg of the Y is now two windings in series (for example, winding 21 is connected in series with winding 24) and hence the total effective impedance in this leg is 2Z. Therefore, the current is $2E_\phi/2Z = E_\phi/Z$. Therefore, in Fig. 1a, heaters 20a and 20b are subjected to a current $E_\phi/Z$, the same as in Fig. 1. Similar analysis will show corresponding results in the Figs. 2 and 2a circuits.

It is to be noted that in the protective devices used, the relationship of the resistance of the heaters of the protective switches to the resistance of the discs is such that the heat generated by the heaters by current passing therethrough is greater than the heat generated in the discs. That is, on a comparative basis the resistance of the heater may be classed as high and the resistance of the disc low. Therefore, under conditions of overload resulting in increased current, the operation of the protective switches is influenced more by the heat of the heaters than by the heat in the discs. Thus, by arranging the internal connections so that the heaters receive the same value of current at both the low and high voltage external connections, the protective switches function properly at both voltages without having to change either the internal connections or the protective switches themselves.

The above circuits are likewise operative if the switch pole represented by contacts 16a and 17a are connected in series in, for example, wire 54 of Fig. 1 (or the analogous wires of Figs. 1a, 2 and 2a) with wire 49 being connected directly to terminal 28 (or the analogous terminal of Figs. 1a 2 and 2a) instead of being connected to plate 15, wire 40 being removed and terminal T12 being connected by wire 41 to contact plate 17b instead of contact plate 17a. In like manner, the switch pole represented by contacts 16b and 17b may be connected in series in wires 52 of Fig. 1, wire 49 being removed and wire 53 being connected to plate 15a; analogous changes may be made in the Figs. 1a, 2 and 2a circuits.

Or, the circuits are operative if wire 53 (for example) is connected directly to terminal 28 instead of to plate 15b, switch pole 16a—17a is connected in series in wire 54, and switch pole 16b—17b is connected in series in wire 52, wire 49 being eliminated. This circuit is illustrated in Figs. 6 and 6a. Similar changes in Figs. 1a, 2 and 2a will result in operative circuits.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A polyphase energy translating device for operation at more than one voltage comprising, windings connectible in parallel for operation at one voltage and connectible in series for operation at another voltage, terminals for connection externally to power supply lines and to each other, at least two thermally responsive double-pole switches mounted in proximity to said windings with each of said switches having both thermal means for actuating it and electrical heat generating means associated with it to provide heat for actuating it, and internal connections between said windings and said terminals with said switches, said thermal means, and their associated heat generating means being included in said internal connections, the latter being predeterminedly arranged so that with one set of external connections to the terminals the said device is adapted to operate at one voltage, with another set of external connections to the terminals said device is adapted to operate at another voltage, and with either set of external connections said heat generating means are traversed by approximately the same electrical current, said thermal means are traversed by current through all the windings, and the said switches are adapted to interrupt directly the current in said windings.

2. A polyphase energy translating device for operation at more than one voltage comprising windings connectible in parallel for operation at one voltage and connectible in series for operation at another voltage, terminals for connection externally to power supply lines and to each other, at least two double-pole switches mounted in proximity to said windings with each of said switches having thermally responsive means for actuating it, internal connections between said windings and said terminals with one pole of one switch being connected in an internal connection for carrying current from one of said power supply lines to said windings, one pole of another switch being connected in another internal connection for carrying current from another of said supply lines to said windings, the second pole of each of said switches being connected in an internal connection other than the one in which its first pole is connected, and internal connections between the rest of said windings and other of said terminals whereby said device is adapted to operate on one voltage with one set of external connections, and on another voltage with a different set of external connections, said thermally responsive means being traversed by the current through all the windings regardless of which set of said external connections is made.

3. A polyphase energy translating device as set forth in claim 2, including electrical heating means in each of said switches adapted to affect their respective thermally responsive means in accordance with the electrical current passing through said heating means, the respective heating means for each switch being connected in one of the internal connections to the switch it affects, one of said terminals being internally connected to a point between the power supply line side of one of said heating means and its respective thermally responsive means, and another of said terminals being internally connected to a point between the power supply line side of another of said heating means and its respective thermally responsive means.

4. A polyphase energy translating device for operation at more than one voltage including a housing, windings in said housing connectible in parallel for operation at one voltage and connectible in series for operation at another voltage, terminals on said housing for connection externally to power supply lines and to each other, at least two double-pole switches mounted in proximity to said windings with each of said switches having thermally responsive means for actuating it, an internal connection between said windings and said terminals for carrying current from one of said power supply lines to said windings with one pole of one switch being connected therein, a second internal connection between windings and terminals for carrying current from another of said power supply lines to said windings with one pole of another switch therein, a third internal connection between said windings and said terminals for carrying current from another of said power supply lines to said windings with at least one of the other poles of said switches being connected therein, the said thermally responsive means of each switch being traversed by the current through all of said windings, and internal connections between the rest of said windings and other of said terminals.

5. A dual-voltage, three-phase, alternating current motor comprising a three-phase stator winding, each of said winding phases having first and second winding sections, a pair of thermal overload switches each having a heat-sensitive element normally bridging a pair of contacts and a heating coil having one end connected to one of said contacts, the other contacts of said switches being adapted to be respectively connected to two phases of a three-phase source of alternating current, the other ends of said heating coils being respectively connected to one end of two of said first winding sections, one end of the third of said first winding sections being adapted to be connected to the third phase of said source of alternating current, the second sections of said winding phases having one of their ends connected together to form a Y connection, and means for at times operating said motor on a low-voltage source of three-phase alternating current with the other ends of said first winding sections being connected together to form a second Y connection and with the other ends of two of said second winding sections being respectively connected to said one contact of said switches and the other end of the third of said second winding sections being connected to said first end of said third of said first winding sections, and for at other times operating said motor from a high voltage source of three-phase alternating current with the other ends of said first and second winding sections of each of said winding phases being connected together.

6. A dual-voltage, three-phase, alternating current motor comprising a three-phase stator winding, each of said winding phases having first and second winding sections, a pair of thermal overload switches each having a heat-sensitive element and a heating coil connected in series, said switches being adapted to be respectively connected to two phases of a three-phase source of alternating current, said heating coils being serially connected to two of said first winding sections, the third of said first winding sections being adapted to be serially connected to the third phase of said source of alternating current, said second winding sections being connected in a Y, and means for at times operating said motor from a low-voltage source of three-phase alternating current with said first winding sections being connected in a second Y and with two of said second winding sections being connected in series with said heat-sensitive elements and the third of said second winding sections being adapted to be serially connected to said third phase of said source of alternating current, and for at other times operating said motor from a high-voltage source of three-phase alternating current with said first and second winding sections of each of said winding phases being respectively serially connected.

7. A dual-voltage, three-phase, alternating current motor comprising a three-phase stator winding, each of said winding phases having first and second winding sections, a pair of thermal overload switches each having a heat-sensitive element normally bridging a pair of contacts and a heating coil having one end connected to one of said contacts, the other contacts of said switches being adapted to be respectively connected to two phases of a three-phase source of alternating current, the other ends of said heating coils being respectively connected to one end of two of said first winding sections, one end of the third of said first winding sections being adapted to be connected to the third phase of said source of alternating current, the second sections of said winding phases having one of their ends connected together to form a Y connection, first switching means having a first position with the other end of one of said second winding sections connected to said one contact of one of said switches, second switching means having a first position with the other end of another of said second winding sections connected to said one contact of the other of said switches, third switching means having a first position with said other end of the third of said second winding sections connected to said one end of said third of said first winding sections, said switching means in their first positions connecting the other ends of said first winding sections together to form a second Y connection, said switching means having second positions with the other ends of the said first winding sections respectively connected to the other ends of said second winding sections, said switching means in their first positions providing a low-voltage connection for said motor and in their second positions providing a high-voltage connection for said motor.

8. A dual-voltage, three-phase, alternating current motor comprising a three-phase stator winding, each of said winding phases having first and second winding sections, a pair of thermal overload switches each having a heat-sensitive element normally bridging a pair of contacts and a heating coil having one end connected to one of said contacts, the other contacts of said switches being adapted to be respectively connected to two phases of a three-phase source of alternating current, the other ends of said heating coils being respectively connected to one end of two of said first winding sections, one end of the third of said first winding sections being adapted to be connected to the third phase of said source of alternating current, the second sections of said winding phases having one of their ends connected together to form a Y connection, and a plurality of switching means having first positions with the other ends of two of said second winding sections respectively connected to said first contacts of said switches and the other end of the third of said second winding sections connected to said first end of the third of said first winding sections and with the other ends of said first winding sections connected together to form a second Y connection, said switching means having second positions with the other ends of said first winding sections and the other ends of said second winding sections respectively connected together, said switching means in their first positions providing a low-voltage connection for said motor and in their second positions providing a high-voltage connection for said motor.

9. A dual-voltage, three-phase, alternating current motor comprising a three-phase stator winding, each of said winding phases having first and second winding sections, a pair of thermal overload switches each having a heat-sensitive element normally bridging a first pair of contacts, a heating coil having one end connected to one of said first contacts, and a second pair of contacts operatively connected to said heat-sensitive element adapted to be opened responsive to said heat-sensitive element opening said first pair of contacts; the other of said first contacts of each of said switches being connected to one contact of the second contacts associated with the other of said switches, the other contacts of said second contacts being respectively adapted to be connected to two phases of a three-phase source of alternating current, the other ends of said heating coils being respectively connected to one end of two of said first winding sections, one end of the third of said first winding sections being adapted to be connected to the third phase of said source of alternating current, said second winding sections having one of their ends connected together to form a Y connection, means for at times operating said motor from a low-voltage source of three-phase alternating current with the other ends of said first winding sections being connected together to form a second Y connection and the other ends of two of said second winding sections being respectively connected to said one contact of said first contacts of said switches and with the other end of the third of said second winding sections being connected to said first end of said third of said first winding sections, and for at other times operating said motor from a high-voltage source of three-phase alternating current with the other ends of said first and second winding sections of each of said winding phases being connected together.

10. A dual-voltage, three-phase, alternating current motor comprising a three-phase stator winding, each of said winding phases having first and second winding sections, a pair of thermal overload switches each having a heat-sensitive element normally bridging a first pair of contacts, a heating coil having one end connected to one of said first pair of contacts, and a second pair of contacts operatively connected to said heat-sensitive element and adapted to be opened responsive to said heat-sensitive element opening said first pair of contacts; the other contact of each of said first pair of contacts being connected to one contact of the second pair of contacts associated with the other of said switches, the other contacts of said second pair of switches being adapted to be respectively connected to two phases of a three-phase source of alternating current, the other ends of said heating coils being respectively connected to one end of two of said first winding sections, four external terminals, one end of the third of said first winding sections being connected to the first of said terminals, said first terminal being adapted to be connected to the third phase of said source of alternating current, said second winding sections having one of their ends connected together to form a Y connection, means including said terminals for at times operating said motor from a low-voltage source of three-phase alternating current with the other ends of said first winding sections being connected to the second of said terminals to form a second Y connection and the other ends of two of said second winding sections being respectively connected to the third and fourth of said terminals and with said third and fourth terminals being respectively connected to said one contact of said first pair of contacts of said switches and the other end of the third of said second winding sections being connected to said first terminal, and for at other times operating said motor from a high-voltage source of three-phase alternating current with the other ends of said first and second winding sections of each of said winding phases being respectively connected to the second, third and fourth of said terminals.

11. A dual-voltage, three-phase, alternating current motor comprising a three-phase stator winding, each of said winding phases having first and second winding sections, a pair of thermal overload switches each having a heat-sensitive element normally bridging a first pair of contacts and a heating coil connected in series therewith, each of said switches having a second pair of contacts adapted to be opened responsive to said heat-sensitive element opening said first pair of contacts, said first pair of contacts of each of said switches being serially connected with the second pair of contacts associated with the other of said switches, said second pair of contacts being adapted to be respectively connected to two phases of the three-phase source of alternating current, said heating coils being serially connected to two of said first winding sections, the third of said first winding sections being adapted to be serially connected to the third phase of said source of alternating current, said second winding sections being connected in a Y, means for at times operating said motor from a low-voltage source of three-phase alternating current with said first winding sections being connected in a second Y and two of said second winding sections being connected in series with said heat-sensitive elements and with the third of said second winding sections being adapted to be serially connected to said third phase of said source of alternating current, and for at other times operating said motor from a high-voltage source of alternating current with said first and second winding sections of each of said winding phases being respectively serially connected.

12. A dual-voltage, three-phase, alternating current motor comprising a three-phase stator winding, each of said winding phases having first and second winding sections, a pair of thermal overload switches each having a heat-sensitive element normally bridging a first pair of contacts, a heating coil connected to one contact of said first pair of contacts, and a second pair of contacts operatively connected to said heat-sensitive element and adapted to be opened responsive to said heat-sensitive element opening said first pair of contacts; the other of each of said first pair of contacts being connected to one of the second pair of contacts associated with the other of said switches, the other of said second contacts being respectively adapted to be connected to two phases of a three-phase source of alternating current, the other ends of said heating coils being respectively connected to one end of two of said first winding sections, four external terminals, one end of the third of said first winding sections being connected to the first of said external terminals, said first external terminal being adapted to be connected to the third phase of said source of alternating current, said second winding sections having one of their ends connected together to form a Y connection, means including said terminals for at times operating said motor from a low-voltage source of single-phase alternating current with the other ends of said first winding sections being connected to the second of said terminals to form a second Y connection and the other ends of two of said second winding sections being respectively connected to the third and fourth of said terminals and with leads respectively connecting said one contact of said first pair of contacts to said third and fourth terminals and the other end of the third of said second winding sections being connected to said first terminal, and for at other times operating said motor from a high-voltage source of three-phase alternating current with the other ends of said first and second winding sections of each of said winding phases being respectively connected to said second, third and fourth terminals and with said leads being disconnected from said third and fourth terminals.

13. A three-phase, alternating current motor comprising a three-phase stator winding, each of said winding phases having first and second winding sections, a pair of thermal overload switches each having a heat-sensitive element normally bridging a pair of contacts and a heating coil having one end connected to one of said contacts, the other contacts of said switches being adapted to be respectively connected to two phases of the three-phase source of alternating current, the other ends of said heating coils being respectively connected to one end of two of said first winding sections, and four external terminals, one end of the third of said first winding sections being connected to the first of said external terminals, said first external terminal being adapted to be connected to the third phase of said source of alternating current, said second sections of each of said winding phases having one of their ends connected together to form a Y connection, the other ends of said first winding sections being connected to the second of said external terminals to form a second Y connection, the other ends of two of said second winding sections being respectively connected to a third and fourth of said external terminals, said third and fourth external terminals being respectively connected to said one contact of said switches, and the other end of said third of said second winding sections being connected to said first terminal.

14. A three-phase, alternating current motor comprising a three-phase stator winding, each of said winding phases having first and second winding sections, a pair of thermal overload switches each having a heat-sensitive element normally bridging a first pair of contacts, a heating coil having one end connected to one of said first contacts, and a second pair of contacts operatively connected to said heat-sensitive element adapted to be opened responsive to said heat-sensitive element opening said first pair of contacts; the other of said first contacts of each of said switches being connected to one contact of the second contacts associated with the other of said switches, the other contacts of said second contacts being respectively adapted to be connected to two phases of a three-phase source of alternating current, the other ends of said heating coils being respectively connected to one end of two of said first winding sections, and four external terminals, one end of the third of said first winding sections being connected to the first of said terminals, said first terminal being adapted to be connected to the third phase of said source of alternating current, said second winding sections having one of their ends connected together to form a Y connection, the other ends of said first winding sections being connected to the second of said terminals to form a section Y connection, the other ends of two of said second winding sections being respectively connected to the third and fourth of said terminals, said third and fourth terminals being respectively connected to said one contact of said first pair of contacts of said switches, and the other end of the third of said second winding sections being connected to said first terminal.

15. A dual voltage, three-phase, energy translating device comprising a three-phase winding having a first, second and third winding phase, each of said winding phases having first and second winding sections, a pair of thermal overload switches each having a heat-sensitive element normally bridging a pair of contacts and a heating coil having one end connected to one of said contacts, the other contacts of said switches being adapted to be connected respectively to two phases of a three-phase source of alternating current, the other end of one of said heating elements being connected to one end of a first winding section of the first winding phase and to one end of a second winding section of the second winding phase, the other end of the other of said heating elements being connected to one end of a first winding section of the second winding phase and to one end of a second winding section of the third winding phase, one end of a second winding section of the first winding phase and one end of a first winding section of the third winding phase being adapted to be connected to the third phase of said source of alternating current, and means for at times operating said motor on a low voltage source of three phase alternating current with the other ends of said first winding section of the first winding phase and said second winding section of the third winding phase being connected to said one end of the second winding section of the first winding phase, and with the other ends of said first winding section of the third winding phase and said second winding section of the second winding phase being connected to said one contact of one switch, and with the other ends of said second winding section of the first winding phase and said first winding section of the second winding phase being connected to said one contact of the other switch, and for at times operating said motor from a high voltage source of three-phase alternating current with the said other ends of the winding sections in each winding phase being connected together.

16. A dual voltage, three-phase, energy translating device comprising a three-phase winding having a first, second and third winding phase, each of said winding phases having first and second winding sections, a pair of thermal overload switches each having a heat-sensitive element and a heating coil connected in series, said switches being adapted to be connected respectively to two phases of a three-phase source of alternating current, one of said heating coils being serially connected to one end of a first winding section of the first winding phase and to one end of a second winding section of the second winding phase, the other of said heating coils being serially connected to one end of a first winding section of the second winding phase and to one end of a second winding section of the third winding phase, one end of a second winding section of the first winding phase and one end of a first winding section of the third winding phase being adapted to be serially connected to the third phase of said source of alternating current, and means for at times operating said motor on a low voltage source of three phase alternating current with the other ends of the said first winding section of the first winding phase and the said second winding section of the third winding phase being serially connected to said third phase of said source of alternating current, and with the other ends of said first winding section of the third winding phase and said second winding section of the second winding phase being connected in series with one of said heat sensitive elements, and with the other ends of said second winding section of the first winding phase and said first winding section of the second winding phase being connected in series with the other of said heat sensitive elements, and for at times operating said motor from a high voltage source of three-phase alternating current with the said first and second winding sections of each winding phase being respectively serially connected.

17. A dual voltage, three-phase, energy translating device comprising a three phase winding having a first, second and third winding phase, each of said winding phases having first and second winding sections, a pair of thermal overload switches each having a heat-sensitive element normally bridging a pair of contacts and a heating coil having one end connected to one of said contacts, the other contacts of said switches being adapted to be connected respectively to two phases of a three-phase source of alternating current, the other end of one of said heating elements being connected to one end of a first winding section of the first winding phase and to one end of a second winding section of the second winding phase, the other end of the other of said heating elements being connected to one end of a first winding section of the second winding phase and to one end of a second winding section of the third winding phase, one end of a second winding section of the first winding phase and one end of a first winding section of the third winding phase being adapted to be connected to the third phase of said source of alternating current, first switching means having a first position with the other ends of said first winding section of the third winding phase and said second winding section of the second winding phase connected to said one contact of said one switch, second switching means having a first position with the other ends of said second winding section of the first winding phase and said first winding section of the second winding phase connected to said one contact of the other switch, third switching means having a first position with the other ends of said first winding section of the first winding phase and said second winding section of the third winding phase connected to said one end of said second winding section of the first winding phase, said switching means having second positions with the other ends of said first winding sections respectively connected to the other ends of said second winding sections, said switching means in their first positions providing a low-voltage connection for said device and in their second positions providing a high-voltage connection for said device.

18. A dual voltage, three-phase, energy translating device comprising a three-phase winding having a first, second and third winding phase, each of said winding phases having first and second winding sections, a pair of thermal overload switches each having a heat-sensitive element normally bridging a pair of contacts and a heating coil having one end connected to one of said contacts, the other contacts of said switches being adapted to be connected respectively to two phases of a three-phase source of alternating current, the other end of one of said heating elements being connected to one end of a first winding section of the first winding phase and to one end of a second winding section of the second winding phase, the other end of the other of said heating elements being connected to one end of a first winding section of the second winding phase and to one end of a second winding section of the third winding phase, one end of a second winding section of the first winding phase and one end of a first winding section of the third winding phase being adapted to be connected to the third phase of said source of alternating current, and a plurality of switching means having first positions in which the other ends of said first winding section of the third winding phase and said second winding section of the second winding phase are connected to said one contact of said one switch, the other ends of said second winding section of the first winding phase and said first winding section in the second winding phase are connected to said one contact of the other switch, and the other ends of said first winding section of the first winding phase and said second winding section of the third winding phase are connected to said one end of said second winding section of the first winding phase, said switching means having second positions with the other ends of said first winding sections respectively connected to the other ends of said second winding sections, said switching means in their first positions providing a low-voltage connection for said device and in their second positions providing a high-voltage connection for said device.

19. A dual voltage, three-phase, energy translating device comprising a three-phase winding having a first, second and third winding phase, each of said winding phases having first and second winding sections, a pair of thermal overload switches each having a heat-sensitive element normally bridging a first pair of contacts and a heating coil having one end connected to one of of said first contacts, and a second pair of contacts operatively connected to said heat-sensitive element adapted to be opened responsive to said heat-sensitive element opening said first pair of contacts, the other of said first contacts of each of said switches being connected to one contact of the second contacts associated with the other of said switches, the other contacts of said second contacts being respectively adapted to be connected to two phases of a three phase source of alternating current, the other end of one of said heating coils being connected to one end of a first winding section of the first winding phase and to one end of a second winding section of the second winding phase, the other end of the other of said heating coils being connected to one end of a first winding section of the second winding phase and to one end of a second winding section of the third winding phase, one end of a second winding section of the first winding phase and one end of a first winding section of the third winding phase being adapted to be connected to the third phase of said source of alternating current, and means for at times operating said motor on a low voltage source of three phase alternating current with the other ends of said first winding section of the first winding phase and said second winding section of the third winding phase being connected to said one end of said second winding section of the first winding phase, and with the other ends of said first winding section of the third winding phase and said second winding section of the second winding phase being connected to said one contact of said first contacts of one switch, and with the other ends of said second winding section of the first winding phase and said first winding section of the second winding phase being connected to said one contact of said first contacts of the other switch, and for at times operating said motor from a high voltage source of three-phase alternating current with the said other ends of said winding sections in each winding phase being connected together.

20. A dual voltage, three-phase, energy translating device comprising a three-phase winding having a first, second and third winding phase, each of said winding phases having first and second winding sections, a pair of thermal overload switches each having a heat-sensitive element normally bridging a first pair of contacts and a heating coil connected in series therewith, each of said switches having a second pair of contacts adapted to be opened responsive to said heat-sensitive element opening said first pair of contacts, said first pair of contacts of each of said switches being serially connected with the second pair of contacts associated with the other of said switches, said second pair of contacts being respectively adapted to be connected to two phases of a three phase source of alternating current, the other end of one of said heating coils being serially connected to one end of a first winding section of the first winding phase and to one end of a second winding section of the second winding phase, the other end of the other of said heating coils being serially connected to one end of a first winding section of the second winding phase and to one end of a second winding section of the third winding phase, one end of a second winding section of the first winding phase and one end of a first winding section of the third winding phase being adapted to be serially connected to the third phase of said source of alternating current, and means for at times operating said motor on a low voltage source of three phase alternating current with the other ends of said first winding section of the first winding phase and said second winding section of the third winding phase being adapted to be serially connected to said third phase of said source of alternating current, and with the other ends of said first winding section of the third winding phase and said second winding section of the second winding phase being connected in series with said one contact of said first contacts of one switch, and with the other ends of said second winding section of the first winding phase and said first winding section of the second winding phase being connected in series with said one contact of said first contacts of the other switch, and for at times operating said motor from a high voltage source of three-phase alternating current with the said other ends of the winding sections in each winding phase being respectively serially connected.

References Cited in the file of this patent
UNITED STATES PATENTS

| | | |
|---|---|---|
| Re. 22,973 | Kurtz | Feb. 10, 1948 |
| 1,123,321 | Lamme | Jan. 5, 1915 |
| 1,701,382 | MacMillan | Feb. 5, 1929 |
| 2,057,525 | Horning | Oct. 13, 1936 |
| 2,304,599 | Rigby | Dec. 8, 1942 |
| 2,445,434 | Hornbarger | July 20, 1948 |
| 2,543,131 | Seifried | Feb. 27, 1951 |